US012244734B2

(12) United States Patent
Peddada et al.

(10) Patent No.: US 12,244,734 B2
(45) Date of Patent: Mar. 4, 2025

(54) CERTIFICATE REVOCATION AT DATACENTERS

(71) Applicant: Salesforce, Inc., San Francisco, CA (US)

(72) Inventors: Prasad Peddada, Alameda, CA (US); Taher Elgamal, San Francisco, CA (US); Joseph Salowey, Seattle, WA (US)

(73) Assignee: Salesforce, Inc., San Francisco, CA (US)

( * ) Notice: Subject to any disclaimer, the term of this patent is extended or adjusted under 35 U.S.C. 154(b) by 315 days.

(21) Appl. No.: 17/387,033

(22) Filed: Jul. 28, 2021

(65) Prior Publication Data
US 2023/0032867 A1 Feb. 2, 2023

(51) Int. Cl.
*H04L 9/32* (2006.01)
(52) U.S. Cl.
CPC .......... *H04L 9/3268* (2013.01); *H04L 9/3247* (2013.01)
(58) Field of Classification Search
CPC .................. H04L 9/3268; H04L 9/3247
See application file for complete search history.

(56) References Cited

U.S. PATENT DOCUMENTS

2005/0228998 A1* 10/2005 Chan .................... H04L 9/3268
    713/175
2019/0394042 A1* 12/2019 Peddada ............... H04L 9/0894

OTHER PUBLICATIONS

Menezes et al., "Handbook of Applied Cryptography, 13.6.3 Certificate Distribution and Revocation," Handbook of Applied Cryptography [CRC Press Series on Discrete Mathematics and Its Applications], Jan. 1, 1997, 3pgs, CRC Press, Boca Raton, FL, United States.

* cited by examiner

*Primary Examiner* — Jeffrey C Pwu
*Assistant Examiner* — Mayasa A. Shaawat
(74) *Attorney, Agent, or Firm* — Holland & Hart LLP

(57) ABSTRACT

Methods, systems, and devices supporting data processing are described. In some systems, a first service executing on a datacenter may receive a request to establish a secure connection and a certificate from a second service. The datacenter may be provisioned with an indication of certificates that have been revoked by a certificate authority (CA). The first service may validate a certificate chain for the certificate from the second service based on the certificates that have been revoked by the CA. If a certificate of the certificate chain has been revoked, the first service may not establish the connection with the second service. If the certificates of the certificate chain have not been revoked, the first service may establish a secure connection with the second service. The services may communicate in accordance with validating the certificate chain.

18 Claims, 10 Drawing Sheets

CERTIFICATE REVOCATION AT DATACENTERS

FIELD OF TECHNOLOGY

The present disclosure relates generally to database systems and data processing, and more specifically to certificate revocation at datacenters as a service.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

Cryptographic keys are used in a variety of applications, including security of data on a server or data store. In some examples, a key may be used to encrypt contents of an entire data store or large portions of a data store. If that key is compromised, then all of the data of the data store may be compromised. Unauthorized disclosure of data may result in harm to a user, an organization, or both.

DETAILED DESCRIPTION

Figure 1:
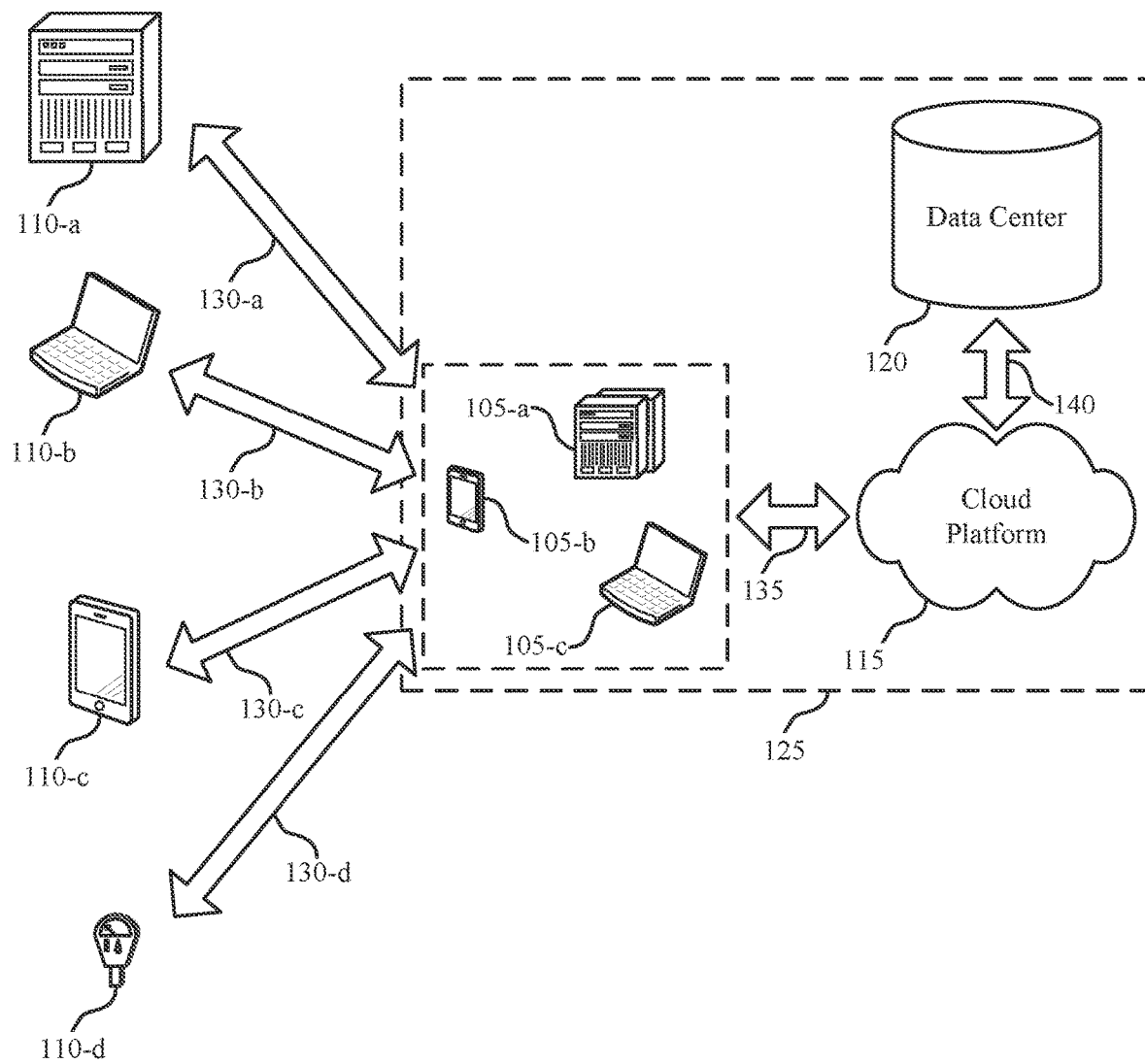
FIG. 1 illustrates an example of a data processing system that supports certificate revocation at datacenters as a service in accordance with aspects of the present disclosure.

Some systems may implement public key cryptography using a public key and a private key. These keys may be used by services and devices to establish secure connections with other devices (e.g., using transport layer security (TLS) processes). In some cases, a certificate authority (CA) may issue a digital certificate that certifies the ownership of a public key by the named subject of the certificate. When a private key is compromised, the CA may add the associated certificate to a certificate revocation list (CRL) or another list that includes a listing of certificates that are invalid. A client that is attempting to establish a connection with a service with a certificate may retrieve the list from the corresponding CA in order to determine whether the service's certificate is valid. In some cases, however, the client, service, or both may disable checking the validity of certificates using lists due to implementation complexities as well as to prevent applications from failing due to network connectivity issues.

According to implementations described herein, the services may be provisioned with local lists of revoked certificates (e.g., CRLs), such that certificates may be checked locally in the datacenter in which the service is executing without having to communicate with a CA over the internet. Thus, certificate revocation may be enabled for one or more services that include certificates for establishing a connection with an application (e.g., another service), establishing a connection with a client, and the like. When the service receives a request to establish a secure connection from another service, the service may validate a certificate chain for a certificate of the other service by checking the list of certificates that have been revoked. Thus, using these techniques, the device or service may perform a certificate revocation check using a local list of revoked certificates, and thus may avoid using a stale certificate revocation list, since the list may be provisioned locally and without (or with limited) network connectivity concerns.

In some cases, the list may be distributed to each service (e.g., each application server or host) of a datacenter. Additionally or alternatively, the list may be distributed to a micro-service executing in the datacenter, and each application server or host may use the micro-service for validating a certificate. In some examples, both devices and services may use certificates in a mutual TLS (mTLS) process, such that both services may validate certificates prior to establishing a secure connection. The techniques described herein may support security in ecosystems where many different services and systems are communicating.

Aspects of the disclosure are initially described in the context of an environment supporting an on-demand database service. Aspects of the disclosure are further described with respect to a general system diagram and a block diagram illustrating computing components that support certificate revocation management. Aspects of the disclosure are further described with respect to a process flow diagram illustrating various processes supporting certificate revocation management. Aspects of the disclosure are further illustrated by and described with reference to apparatus diagrams, system diagrams, and flowcharts that relate to certificate revocation at datacenters as a service.

FIG. 1 illustrates an example of a system 100 for cloud computing that supports certificate revocation at datacenters as a service in accordance with various aspects of the present disclosure. The system 100 includes cloud clients 105, contacts 110, cloud platform 115, and datacenter 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more datacenters 120.

Datacenter 120 may include multiple servers. The multiple servers may be used for data storage, management, and processing. Datacenter 120 may receive data from cloud platform 115 via connection 140, or directly from the cloud client 105 or an interaction 130 between a contact 110 and the cloud client 105. Datacenter 120 may utilize multiple redundancies for security purposes. In some cases, the data stored at datacenter 120 may be backed up by copies of the data at a different datacenter (not pictured).

Subsystem 125 may include cloud clients 105, cloud platform 115, and datacenter 120. In some cases, data processing may occur at any of the components of subsystem 125, or at a combination of these components. In some cases, servers may perform the data processing. The servers may be a cloud client 105 or located at datacenter 120. The system 100 may include one or more services or devices, which may be implemented at a datacenter 120, a user device or contact 110, or the like. A service may communicate with another service or device supported by a same or different platform. For example, the service may receive a connection request from another service, a user device, or both for establishing a secure connection for communications. As described herein, a service may correspond to an application or service executing on a server (e.g., subsystem 125), an application executing on a user computing device, or another computing device. A service may be referred to as a client, application, etc.

In some examples, the services may use private key-public key pairs to establish a secure connection (e.g., TLS). A service may transmit an indication of a certificate associated with its private key and issued by a CA to another service or a user device implementing the service. The CA may maintain a revocation list that includes one or more certificates that may no longer be valid certificates (e.g., compromised, outdated, or otherwise not secure), which may be referred to as a CRL. When a private key is compromised, a CA may issue a new CRL or may update an existing CRL with the certificate to be revoked or invalidated. In some cases, a user device or client 105 may access the CRL to see if a received certificate (e.g., from a service) is part of the list. If the certificate is on the list, the user device or client may receive a request to perform a different action based on a security policy. In some cases, the security policy may deny a connection with the service that sent the certificate. In other cases, policy may be that the connection is established but the failed certificate revocation check may be logged. In some cases, however, the client and/or service may disable checking the validity of certificates using CRLs due to implementation complexities as well as to prevent applications from failing due to network connectivity issues. In some cases, in order to circumvent these issues, certificates may be issued with short time-to-lives (TTLs).

According to techniques described herein, rather than accessing a list of revoked certificates, such as a CRL, over a network, the CRL may be distributed to applications in production. That is, lists of revoked certificates may be stored locally, such as at a datacenter 120, or may be accessed by a micro-service running in a datacenter 120 on which the application/service is executing. In some cases, the list of certificates that have been revoked may be distributed to the datacenter 120 prior to a service receiving a connection request. The service may validate a certificate chain for a certificate by checking the list stored locally at the datacenter 120 (among other validation checks) after receiving a connection request (e.g., from another service or a device). In some examples, a network may distribute the list directly to the datacenter 120. In some other cases, datacenter 120 may use a micro-service with the list of revoked certificates running in each datacenter. Once the service validates a certificate for another service, a security policy may allow the services to exchange communications via a secure channel. If the service fails to validate the certificate, then the security policy may indicate for the services to refrain from exchanging communications (e.g., not establish a secure channel) or may establish the secure channel and log the validation failure.

For example, if a browser attempts to establish a connection with a website, the browser, the website, or both may check a certificate chain for a certificate against a locally stored list of revoked certificates prior to establishing the connection. A similar process may occur for a user device attempting to establish a connection with an application or the like.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
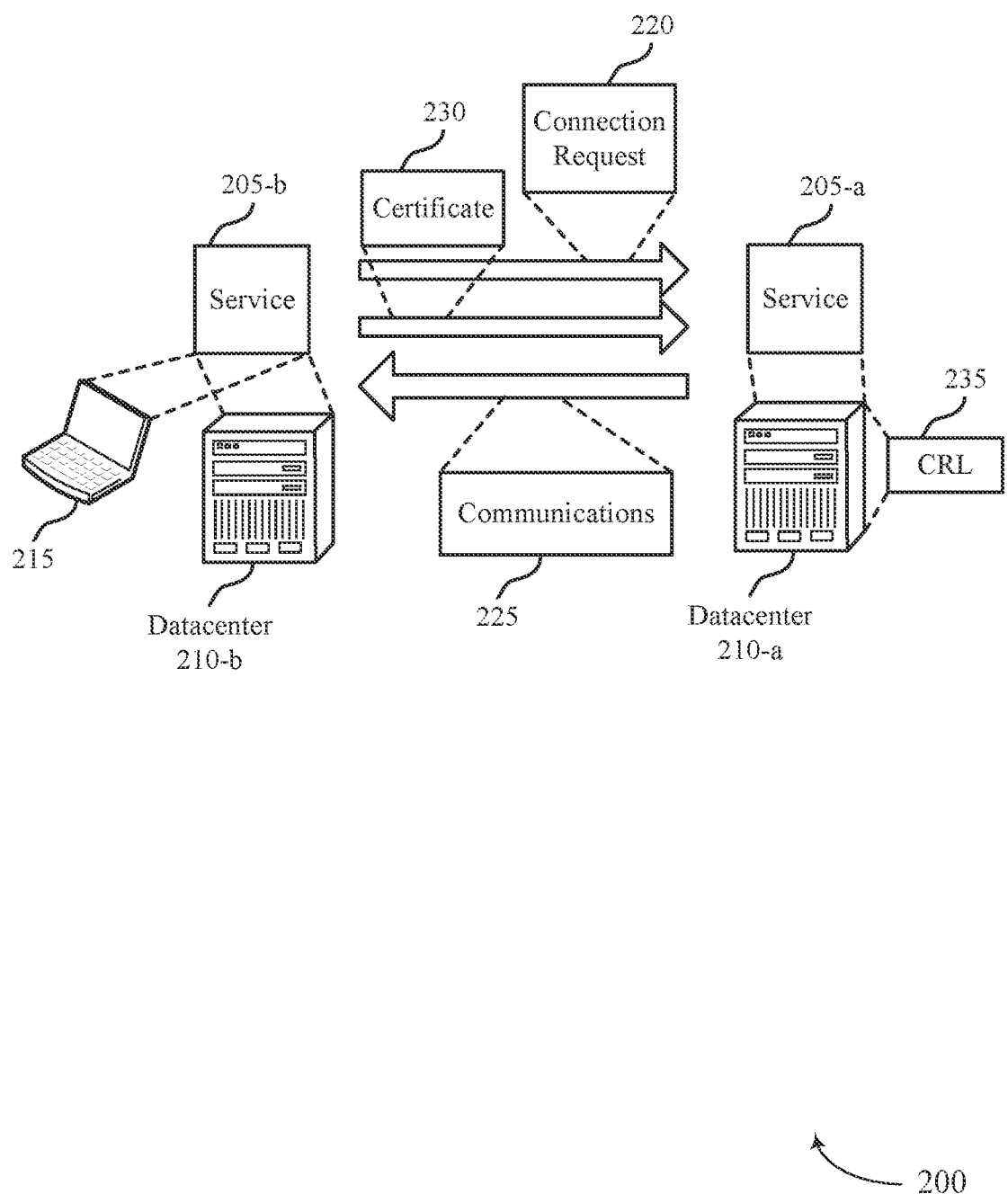
FIG. 2 illustrates an example of a system that supports certificate revocation at datacenters as a service in accordance with aspects of the present disclosure.

FIG. 2 illustrates an example of a system 200 that supports certificate revocation at datacenters as a service in accordance with aspects of the present disclosure. The system 200 may include one or more services 205, such as service 205-*a* and service 205-*b*, which may be examples of an application (e.g., a client application). The services 205 may be implemented at a datacenter 210, a user device 215, or the like. For example, service 205-*a* may be implemented at a datacenter 210-*a*, while service 205-*b* may be implemented at datacenter 210-*b*, user device 215, or both. In some cases, the user device 215 may be an example of a client device running a client application, such as a cloud client 105 or a contact 110 as described with reference to FIG. 1 or a client computing component or system in some other system. A service 205 may communicate with another service 205 supported by a same or different platform. For example, service 205-*a* supported by datacenter 210-*a* may receive a connection request 220 from service 205-*b* supported by datacenter 210-*b*, a user device 215, or both for establishing a secure connection for communications 225.

In some examples, a service 205 may be supported by a server, which may be an application server, a database server, a cloud-based server, a server cluster, a virtual machine, a container, a datacenter 210, or any combination of these or other devices or systems of devices. For example, datacenter 210-*a*, datacenter 210-*b*, or both may support backend services 205 with which a client may communicate. Datacenter 210-*a* may support service 205-*a*, and datacenter 210-*b* may support service 205-*b*. Additionally or alternatively, a client may be a service 205 that communicates with another service 205. That is, service 205-*b* may be implemented at a user device 215, which may communicate with service 205-*a*.

Upon downloading, execution, etc., of an application for a service 205, the service 205 may transmit a connection request 220 to another service 205. For example, service 205-*b*, which may be a browser, may send a connection request 220 to service 205-*a*, which may be a web service. In some examples, the services 205 may use respective private key-public key pairs to establish a secure connection based on the connection request 220. Service 205-*b* may transmit an indication of a certificate 230 to the service 205-*a* or a user device implementing service 205-*a*. The certificate 230 may be issued by a CA associated with the service 205. such as a public CA or a private CA (e.g., a CA that supports the datacenter 210-*a*). In some cases, service 205-*a* may validate the certificate 230 if the certificate 230 was issued by service 205-*b* or another server associated with the datacenter 210-*b* (e.g., a database system of datacenter 210-*b*), and may identify the public key associated with the certificate 230. Service 205-*a* may validate the user device if the certificate chain associated with the certificate is validated (e.g., the certificate is not expired, it is validly signed, etc.). A service 205 may establish a connection (e.g., for performing application programming interface (API) calls for a user device 215) if this validation procedure is successful.

Validating the user device at the application server based on the certificate may involve a mTLS procedure or an API call validation. For example, the connection request 220 transmitted from service 205-*b* (e.g., a user device 215 to an application server) to service 205-*a* may be signed using the private key and may include the certificate or an indication of the certificate. Service 205-*a* may perform an TLS procedure to validate the identity of service 205-*b* based on this request. In some other examples, service 205-*b* may transmit a request header (e.g., for an API call), a token (e.g., a JavaScript Object Notation web token), or the like to service 205-*a* that is signed using the private key, and service 205-*a* may validate service 205-*b* (e.g., the user device 215) based on the received API call/token In some cases, this request header may additionally include the or an indication of the certificate. In some examples, both services 205, such as service 205-*a* and service 205-*b*, may exchange certificates for validation (e.g., a mTLS procedure).

In some cases, a CA may maintain a revocation list that includes one or more certificates 230 that may no longer be valid certificates 230 (e.g., compromised, outdated, or otherwise not secure), which may be referred to as a CRL 235. When a private key is compromised, a CA may issue a new CRL 235 or may update an existing CRL 235 with the certificate to be removed. In some cases, a user device 215 or client may access the CRL 235 to see if a received certificate 230 is part of the list. If the certificate 230 is on the list, the user device 215 or client may refrain from establishing a connection with the service 205 that sent the certificate 230. For example, service 205-*a* may check a list of invalid certificates, such as a CRL 235, for the certificate 230 from service 205-*b*. If the list includes the certificate 230, then service 205-*a* may not establish a connection with service 205-*b*.

In some cases, if a browser connects with a web service, the browser may access a pointer to a CA and retrieve a corresponding list. The browser may check whether a certificate 230 is valid by checking whether the certificate 230 is on the list. In some examples, instead of retrieving an entire list, if a service 205, such as the browser, is connected to a server, the service 205 may request directly from the server whether the certificate is valid (e.g., each time the browser connects to the web service). If the server has connectivity issues, the service 205 making an outgoing connection to one or more other services 205 may be unable to perform certificate revocation, which may cause the service 205 to use a compromised private key (e.g., for a man-in-the-middle (MitM) attack) or may cause the service 205 to be unusable due to failing to perform certificate revocation checking. Thus, certificate revocation checks may be disabled for various services or clients due to complexities or connectivity issues, which may reduce security in various systems and services. In some cases, in order to enhance security in such scenarios, certificates with short time-to-live (TTLs) may be issued such that the certificate expires before it may be revoked. However, such techniques come with tradeoffs, such as increased complexities (e.g., due to certificates being issued more often).

According to techniques described herein, the CRL 235 (or an indication of revoked certificates) may be distributed to applications in production. That is, lists of revoked certificates may be stored locally, such as at a datacenter 210, or may be accessed by a micro-service running at a datacenter 210. The list of revoked certificates may be relatively large, so the network may use a bloom filter to reduce the size of the CRL 235. The bloom filter may compress the CRL 235 from gigabytes of data to megabytes of data, which is described in further detail with respect to FIG. 3.

In some cases, a CRL 235 (or an indication of revoked certificates) may be distributed to datacenter 210-a prior to service 205-a receiving a connection request 220 from service 205-b. Once service 205-a receives the connection request 220 and the certificate 230 for service 205-b, service 205-a may validate a certificate chain for the certificate 230. For example, service 205-a may check the CRL 235 stored locally at datacenter 210-a for one or more certificates including the certificate 230 according to the certificate chain, where the certificate chain includes a list of intermediate certificates 230 as well as an end user certificate 230 for service 205-b. In some examples, a network may distribute the CRL 235 to datacenter 210-a (e.g., periodically). In some other cases, datacenter 210-a may use a micro-service with the list of revoked certificates (e.g., the CRL 235) running in each datacenter 210. Service 205-a may use a plug-in that validates a certificate 230 (e.g., checks whether the certificate 230 is on the CRL 235). Thus, instead of distributing the CRL 235 to each application server, or datacenter 210, the network may distribute the CRL 235 to the datacenter 210 the application server supports so the datacenter 210 may have local access. It should be understood that validation of the certificate chain includes checking for valid signatures, checking the TTL associated with the certificates, etc., in addition to checking whether the certificates are on the CRL 235.

Once service 205-a validates the certificate 230 for service 205-b, service 205-a and service 205-b may establish a secure connection (e.g., using TLS, mTLS, or another cryptographic protocol) to exchange communications 225. The communications 225 may involve service 205-b accessing information or data from service 205-a. For example, a browser or a user device 215 (e.g., a laptop or cellular device) may receive a certificate 230 from a web service. The browser or user device 215 may use a locally stored list of revoked certificates to validate the certificate chain of the received certificate 230. If the certificate 230 is not on the list (e.g., is valid), the browser may establish the connection with the web service. The browser may use the web service to exchange information.

If the system 200 is operating according to an mTLS procedure, service 205-a may also send a certificate to service 205-b for validation. Service 205-b may check a certificate chain for the certificate against a CRL 235, or other list of revoked certificates, stored locally at a database or using a micro-service. If service 205-a, service 205-b, or both fail to validate a certificate chain for a certificate 230 (e.g., if a certificate in the certificate chain for the certificate 230 is on the CRL 235), then service 205-a and service 205-b may take action based on a policy, such as drop a connection. That is, a browser or user device 215 may not establish a secure connection with a web service for communications 225 based on a security policy.

Figure 3:
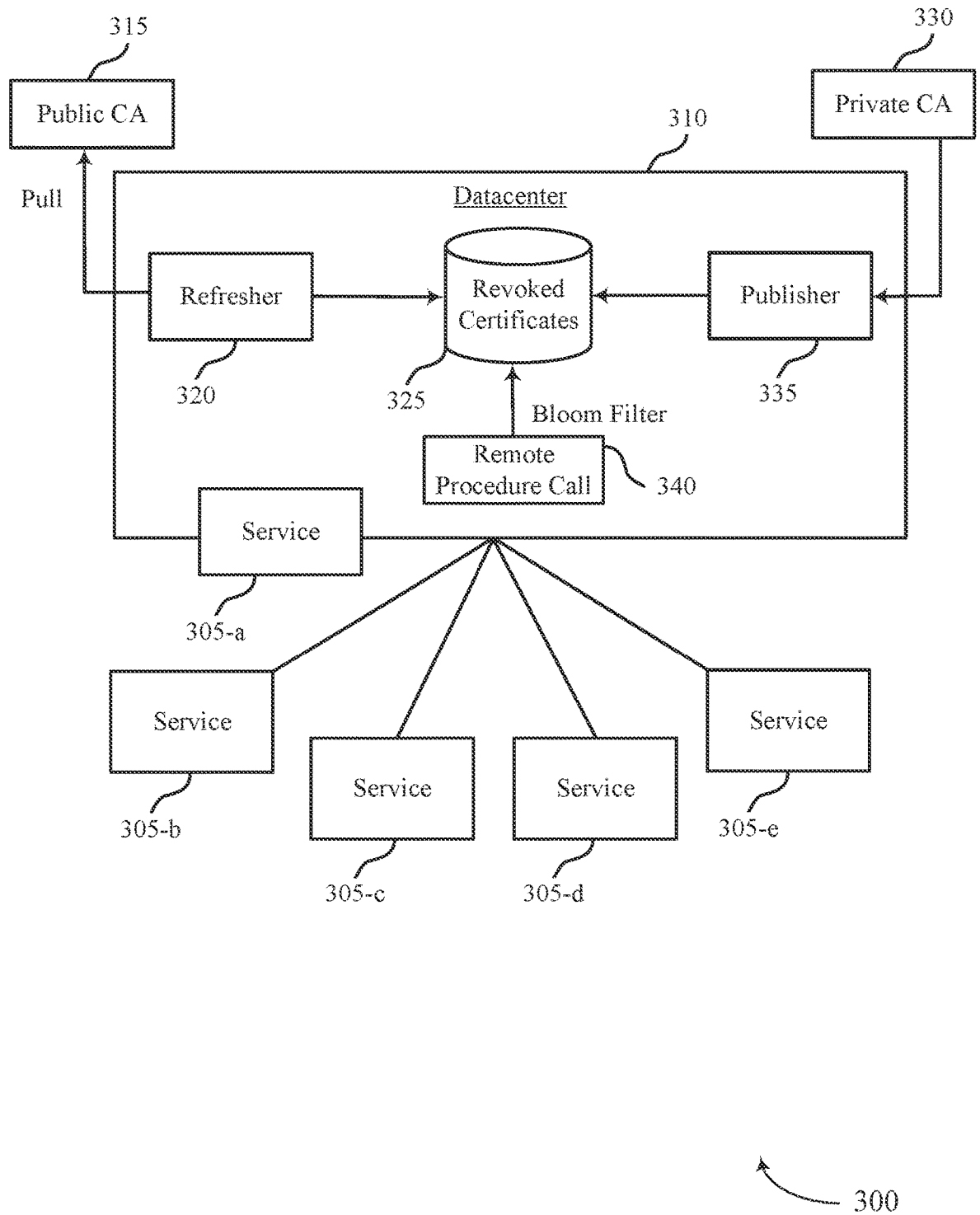
FIG. 3 illustrates an example of a system that supports certificate revocation at datacenters as a service in accordance with aspects of the present disclosure.

FIG. 3 illustrates an example of a system 300 that supports certificate revocation at datacenters as a service in accordance with aspects of the present disclosure. The system 300 may be implemented to support one or more services 305, such as service 305-a through service 305-e, which may be examples of services 205 as described with reference to FIG. 2. The services 305 be implemented at a datacenter 310 (e.g., a datacenter 210 as described with reference to FIG. 2), a user device, or the like. For example, service 305-a may be implemented at a datacenter 310. A service 305 may communicate with another service 305 supported by a same or different platform. For example, service 305-a supported by the datacenter 310 may receive a connection request via a procedure call from any of service 305-b through service 305-e.

An application server may support an application that may execute on user devices. The application may authenticate with the server before the application and user are able to access various services 305. In some cases, authentication keys or access tokens may be used for access. However, key management may be complex and subject to MitM attacks, in which an unauthorized party may gain access to a key and access user data and services supported by the application. In some examples, if the service 305-a is connected to a network (e.g., the internet) and receives a connection request from another service 305, service 305-a may actively pull a list of revoked certificates from a publicly accessible CA 315.

However, according to techniques described herein, the datacenter supporting the service may be provisioned with an indication of revoked certificates 325. The datacenter 310 may use a refresher 320 to pull an updated CRL from the public CA 325 to update the indication of revoked certificates 325 based on the service 305-a receiving a connection request (or based on an update schedule). In the same or in an alternative implementation, certificates for various services (e.g., internal services or client devices) may be issued by a private CA 330. Thus, the indication of revoked certificates 325 may be periodically updated via publisher 335 with private certificates from the private CA 330. In some cases, a network (e.g., an internal or local area network (LAN)) may distribute a list of revoked certificates (e.g., CRLs), to each datacenter 310 in production. There may be a puppet running on each datacenter 310, such that the datacenter 310 may request an updated indication of revoked certificates 325 and the network sends the indication of revoked certificates 325 to the datacenter 310 via a private CA 330. For example, the private CA 330 may sign a certificate chain for the certificates. A publisher 335 may distribute the indication of revoked certificates 325 to the datacenter 310 from the private CA 330. Thus, the indication of revoked certificates 325 may include certificates issued by public CA 315, certificates issued by the private CA 330, or both. The publisher 335, the refresher 320, or both may be implemented in a micro-service supported by the datacenter 310. The micro-service may be accessible by each host or a subset of the hosts that the datacenter 310 supports. Thus, service 305-a may access the micro-service in order to validate a certificate chain (e.g., perform a certificate revocation check).

In some cases, instead of using a micro-service at each data center 310, the indication of revoked certificates may be provisioned to each host (e.g., service 305) in an environment. Thus, a pipeline (e.g., puppet/code deployment technique) may be used to provision each host in an environment with the indication of revoked certificates 325. The indication of revoked certificates 325 may be in the form of a CRL, a database table, file, or listing of revoked certificates, or the like. For example, the indication of revoked certificates 325 may be distributed to hosts and/or datacenter as a structured query language (SQL) lite (SQLLite) database.

Thus, upon receiving a connection request from another service 305, service 305-a may validate a certificate chain of the certificate from service 305-b by checking one or more certificates in the certificate chain against the indication of revoked certificates 325 (in conjunction with other certificate validation procedures). As described herein, the service 305 may check a local indication of revoked certificates 325 (e.g., when each host/service is provisioned with the indication of revoked certificates 325) or may transmit a request to a micro-service supported by the data center 310 on which the service 305-a is executing. If a certificate in the certificate chain is on the list, then service 305-a may not establish a secure connection with service 305-b. In some other cases, if a certificate in the certificate chain is not on the list, then service 305-a may establish a secure connection with service 305-b Thus, these techniques may support certificate chain validation without accessing the internet or a WAN. That is, the revoked certificates may be stored locally (e.g., in a LAN). As such, service 305-a may not be connected to a network (e.g., a WAN or the internet) and may receive a connection request form another service 305 (e.g., service 305-b). Service 305-a may use a locally stored copy of a list of revoked certificates, such as a local indication of revoked certificates 325 or a micro-service, to validate the certificate chain for a certificate from the other service 305, such as service 305-b.

A micro-service may be an example of an independently deployable service, a modular service, a container, or the like. In some cases, the network may select the datacenters 310 at which to store the CRLs based on one or more factors (the type of service 305 running at the datacenter 310, the location of the datacenter 310, etc.).

The datacenter 310 may apply a bloom filter based on receiving a remote procedure call to validate a certificate chain for a certificate. The bloom filter may compress the data in the indication of revoked certificates 325, such that searching the indication of revoked certificates 325 for one or more certificates in the certificate chain may be expedited. In some cases, service 305-a may check multiple certificates (e.g., in the certificate chain) relatively quickly by compressing the indication of revoked certificates 325. Additionally or alternatively, the datacenter 310 may compress the indication of revoked certificates 325 prior to validating the certificate chain using data compression techniques according to filters, algorithms, or the like.

As described herein, these techniques may be used when one or both services to a connection exchange a token (e.g., JavaScript Object Notation (JSON) web token) rather than the certificates themselves. Thus, upon requesting to establish a secure connection with the service 305-a, the service 305-b may transmit an indication of the JSON web token that is signed using a private key associated with a provisioned certificate. The service may validate the certificate chain of the certificate as described herein, including at least performing a certificate revocation check.

Figure 4:
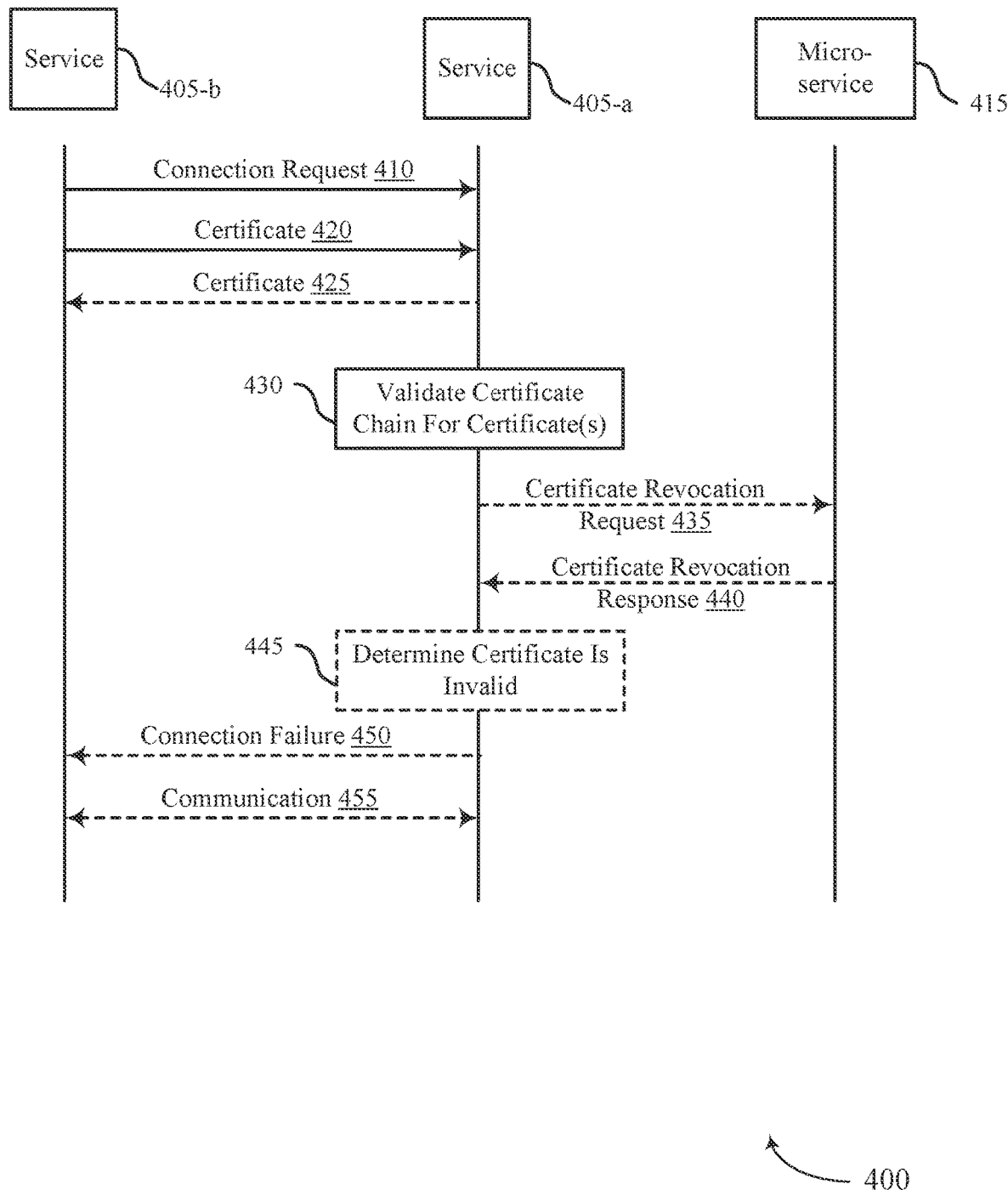
FIG. 4 illustrates an example of a process flow that supports certificate revocation at datacenters as a service in accordance with aspects of the present disclosure.

FIG. 4 illustrates an example of a process flow 400 that supports certificate revocation at datacenters as a service in accordance with aspects of the present disclosure. The process flow diagram 400 may include services 405 (e.g., service 405-a and service 405-b), which may be examples of applications and may be running at a datacenter. Services 405 may be examples of services as described with reference to FIGS. 1 to 3. Alternative examples of the following may be implemented, where some processes are performed in a different order than described or are not performed. In some cases, processes may include additional features not mentioned below, or further processes may be added.

At 410, service 405-b may send a request to establish a secure connection to service 405-a. Service 405-a may be executing on a datacenter provisioned with an indication of certificates that have been revoked by a CA. In some examples, the datacenter may use a micro-service 415 to access the certificates that have been revoked by the CA. The certificates may be in the form of a list, such as a CRL or a database including revoked certificates. In some cases, the certificates may include public CA certificates, internal CA certificates, or both.

At 420, service 405-a may receive an indication of a certificate for service 405-b. For example, service 405-b may send an indication of a certificate to service 405-a after sending the connection request. In some other examples, service 405-b may send the indication of the certificate to service 405-a with the connection request. In some cases, service 405-a may receive a web token that may be digitally signed using the private key. Service 405-a may determine that the certificate is associated with a user device supported by the datacenter based on the certificate chain for the certificate, where the certificate chain may be signed by a private certificate authority.

At 425, service 405-a may transmit an indication of a certificate to service 405-b. For example, if service 405-a and service 405-b are operating according to an mTLS procedure, both services 405 may transmit certificates to each other for validation.

At 430, service 405-a may validate a certificate chain based on the certificate from service 405-b. For example, service 405-a may check the certificates in the certificate chain against the certificates that have been revoked by the CA. In some cases, validating the certificate chain may include validating that the web token is validly signed. Service 405-a may validate the certificate chain on a local area network for the datacenter (e.g., using a micro-service on the data center or using a local list of revoked certificates).

In some cases, at 435, service 405-a may transmit a certificate revocation request to a micro-service 415. The micro-service executing in a datacenter of service 405-a. The certificate revocation request may include an indication of the certificate received from service 405-b.

At 440, service 405-a may receive a certificate revocation response from the micro-service 415 in response to the certificate revocation request. The response may indicate to service 405-a whether the certificate chain is valid or not.

In some other cases, service 405-a may directly receive the indication of the certificates that have been revoked, such that service 405-a is provisioned with the indication of the certificates. Service 405-a may validate the certificate chain for the certificate from service 405-b using the locally provisioned certificates.

At 445, 450, and 455, service 405-a and service 405-b may communicate in accordance with validating the certificate chain. For example, at 445, service 405-a may determine the certificate is invalid based on a certificate in the certificate chain having been revoked (e.g., a certificate in the certificate chain being on the CRL). At 450, service 405-a may send a connection failure message to service 405-b based on determining the certificate chain being invalid. In some other examples, at 455 service 405-a may communicate with 405-b by establishing a secure connection if the certificate chain is valid. In some cases, the service 405-a communicates with service 405-b based on the certificate revocation response received from the micro-service.

Figure 5:
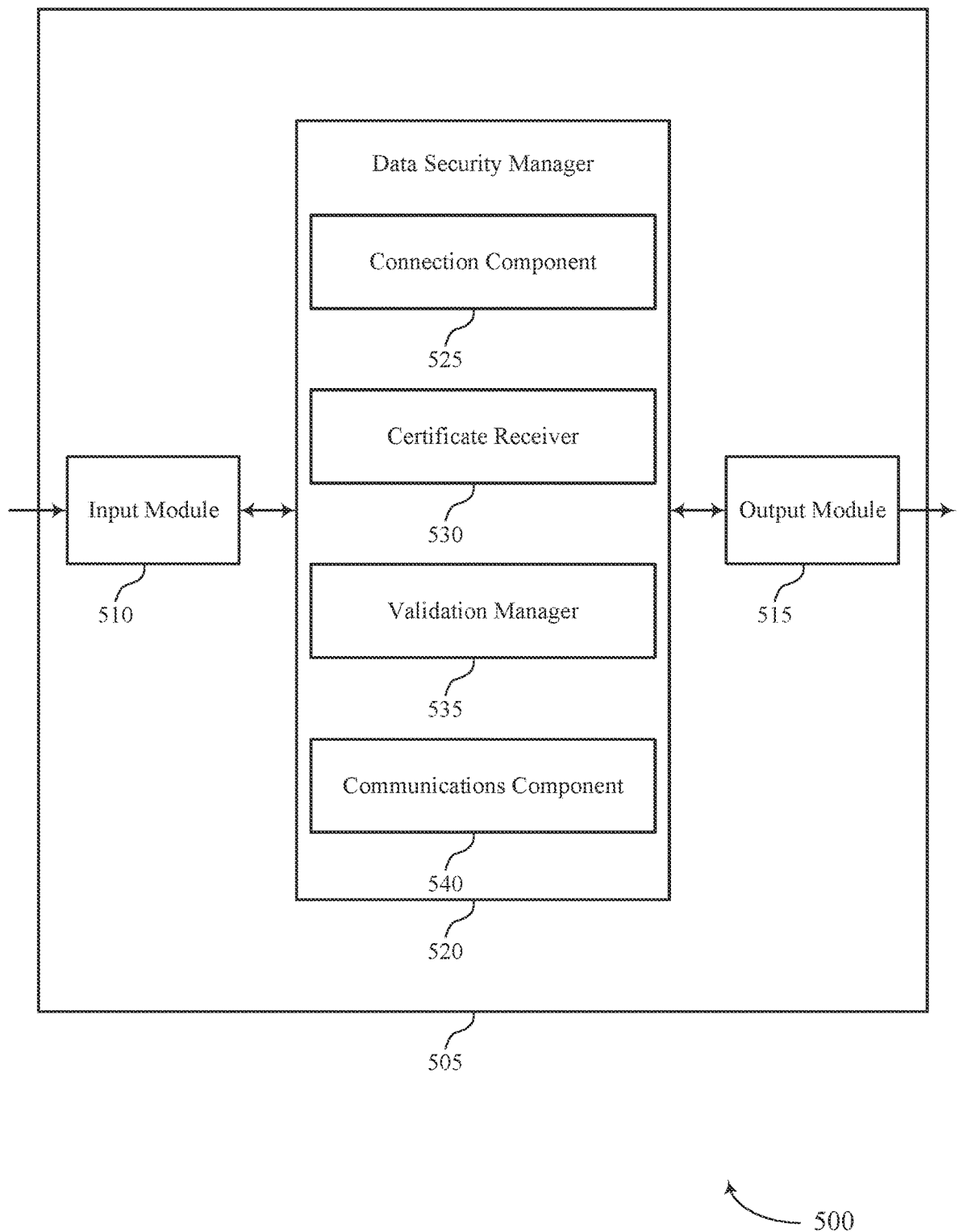
FIG. 5 shows a block diagram of an apparatus that supports certificate revocation at datacenters as a service in accordance with aspects of the present disclosure.

FIG. 5 shows a block diagram 500 of a device 505 that supports certificate revocation at datacenters as a service in accordance with aspects of the present disclosure. The device 505 may include an input module 510, an output module 515, and a data security manager 520. The device 505 may also include a processor. Each of these components may be in communication with one another (e.g., via one or more buses).

The input module 510 may manage input signals for the device 505. For example, the input module 510 may identify input signals based on an interaction with a modem, a keyboard, a mouse, a touchscreen, or a similar device. These input signals may be associated with user input or processing at other components or devices. In some cases, the input module 510 may utilize an operating system such as iOS®, ANDROID®, MS-DOS®, MS-WINDOWS®, OS/2®, UNIX®, LINUX®, or another known operating system to handle input signals. The input module 510 may send aspects of these input signals to other components of the device 505 for processing. For example, the input module 510 may transmit input signals to the data security manager 520 to support certificate revocation at datacenters as a service. In some cases, the input module 510 may be a component of an input/output (I/O) controller 710 as described with reference to FIG. 7.

The output module 515 may manage output signals for the device 505. For example, the output module 515 may receive signals from other components of the device 505, such as the data security manager 520, and may transmit these signals to other components or devices. In some examples, the output module 515 may transmit output signals for display in a user interface, for storage in a database or data store, for further processing at a server or server cluster, or for any other processes at any number of devices or systems. In some cases, the output module 515 may be a component of an I/O controller 710 as described with reference to FIG. 7.

For example, the data security manager 520 may include a connection component 525, a certificate receiver 530, a validation manager 535, a communications component 540, or any combination thereof. In some examples, the data security manager 520, or various components thereof, may be configured to perform various operations (e.g., receiving, monitoring, transmitting) using or otherwise in cooperation with the input module 510, the output module 515, or both. For example, the data security manager 520 may receive information from the input module 510, send information to the output module 515, or be integrated in combination with the input module 510, the output module 515, or both to receive information, transmit information, or perform various other operations as described herein.

The data security manager 520 may support data processing in accordance with examples as disclosed herein. The connection component 525 may be configured as or otherwise support a means for receiving, at a first service executing on a datacenter and from a second service, a request to establish a secure connection, wherein the datacenter is provisioned with an indication of a plurality of certificates that have been revoked by a CA. The certificate receiver 530 may be configured as or otherwise support a means for receiving, from the second service based at least in part on receiving the request, an indication of a certificate associated with the second service. The validation manager 535 may be configured as or otherwise support a means for validating a certificate chain associated with the certificate based at least in part on the indication of the plurality of certificates that have been revoked by the CA. The communications component 540 may be configured as or otherwise support a means for communicating with the second service in accordance with validating the certificate chain.

Figure 6:
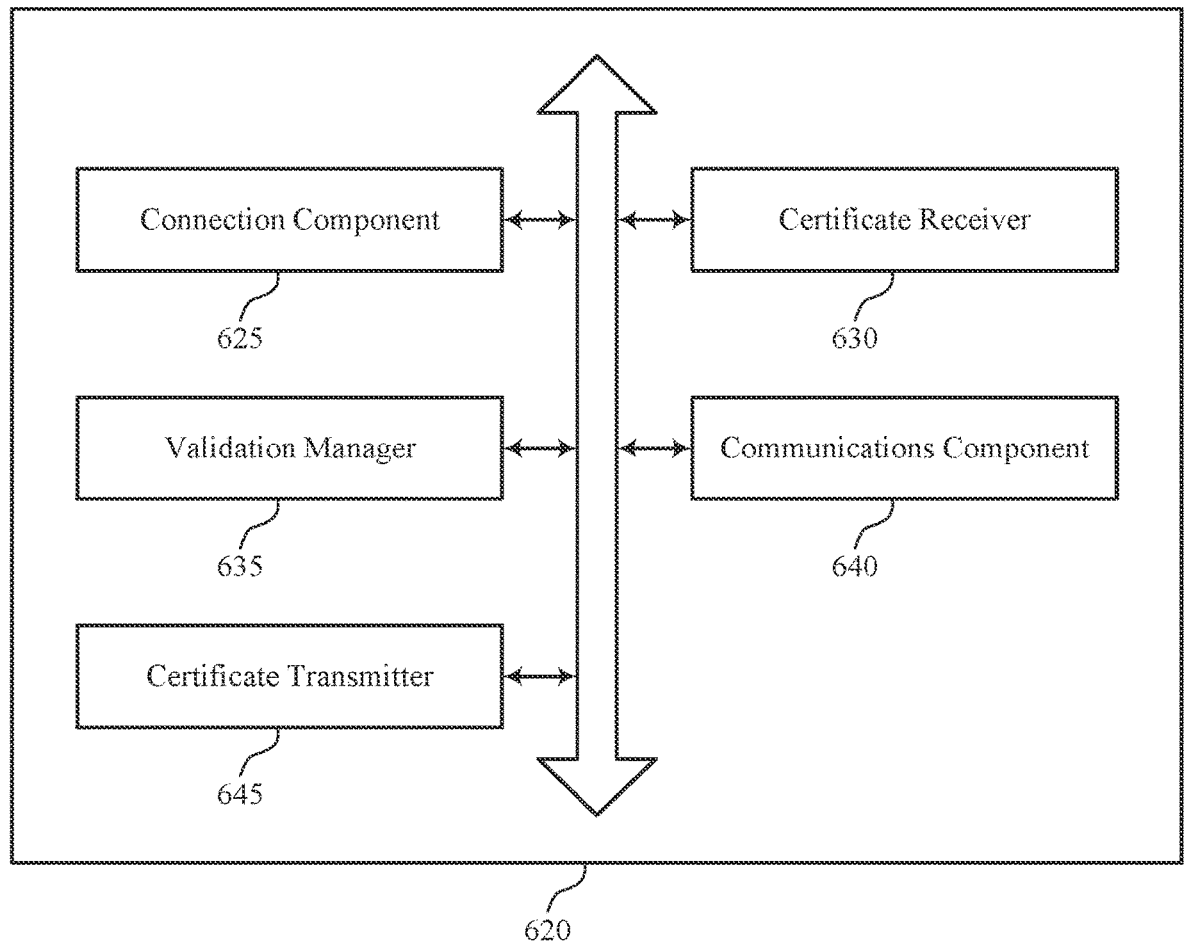
FIG. 6 shows a block diagram of a data security manager that supports certificate revocation at datacenters as a service in accordance with aspects of the present disclosure.

FIG. 6 shows a block diagram 600 of a data security manager 620 that supports certificate revocation at datacenters as a service in accordance with aspects of the present disclosure. The data security manager 620 may be an example of aspects of a data security manager or a data security manager 520, or both, as described herein. The data security manager 620, or various components thereof, may be an example of means for performing various aspects of certificate revocation at datacenters as a service as described herein. For example, the data security manager 620 may include a connection component 625, a certificate receiver 630, a validation manager 635, a communications component 640, a certificate transmitter 645, or any combination thereof. Each of these components may communicate, directly or indirectly, with one another (e.g., via one or more buses).

The data security manager 620 may support data processing in accordance with examples as disclosed herein. The connection component 625 may be configured as or otherwise support a means for receiving, at a first service executing on a datacenter and from a second service, a request to establish a secure connection, wherein the datacenter is provisioned with an indication of a plurality of certificates that have been revoked by a CA. The certificate receiver 630 may be configured as or otherwise support a means for receiving, from the second service based at least in part on receiving the request, an indication of a certificate associated with the second service. The validation manager 635 may be configured as or otherwise support a means for validating a certificate chain associated with the certificate based at least in part on the indication of the plurality of certificates that have been revoked by the CA. The communications component 640 may be configured as or otherwise support a means for communicating with the second service in accordance with validating the certificate chain.

In some examples, the certificate receiver 630 may be configured as or otherwise support a means for receiving, at the first service, the indication of the plurality of certificates such that the first service is provisioned with the indication of the plurality of certificates.

In some examples, to support validating the certificate chain, the validation manager 635 may be configured as or otherwise support a means for transmitting, to a micro-service executing in the datacenter, a certificate revocation request including the indication of the certificate. In some examples, to support validating the certificate chain, the communications component 640 may be configured as or otherwise support a means for receiving, from the micro-service in response to the certificate revocation request, a certificate revocation response, wherein the first service communicates with the second service based at least in part on the certificate revocation response received from the micro-service.

In some examples, to support receiving the indication of the certificate, the validation manager 635 may be configured as or otherwise support a means for receiving a web token that is digitally signed by the certificate, wherein validating the certificate chain includes validating the web token.

In some examples, the validation manager 635 may be configured as or otherwise support a means for determining, based at least in part on validating the certificate chain, that the certificate is invalid in accordance with the certificate being included in the plurality of certificates. In some examples, the communications component 640 may be configured as or otherwise support a means for transmitting, to the second service, an indication of a failure to establish the secure connection based at least in part on determining that the certificate is included in the plurality of certificates.

In some examples, the validation manager 635 may be configured as or otherwise support a means for determining, based at least in part on validating the certificate chain, that the certificate is valid in accordance with the certificate not being included in the plurality of certificates. In some examples, the communications component 640 may be configured as or otherwise support a means for establishing the secure connection with the second service based at least in part on determining the certificate is valid.

In some examples, the validation manager 635 may be configured as or otherwise support a means for determining that the certificate is associated with a user device supported by the datacenter based at least in part on the certificate chain associated with the certificate, wherein the certificate chain is signed by a private CA, wherein the first service communicates with the user device based at least in part on validating the certificate chain.

In some examples, the plurality of certificates comprises public CA certificates, internal CA certificates, or both.

In some examples, the certificate transmitter 645 may be configured as or otherwise support a means for transmitting, based at least in part on receiving the request, an indication of a certificate associated with the first service to the second service.

In some examples, to support validating the certificate chain, the validation manager 635 may be configured as or otherwise support a means for validating the certificate chain on a local area network associated with the datacenter.

In some examples, the indication of the plurality of certificates comprises a certificate revocation list or a database including a plurality of revoked certificates.

Figure 7:
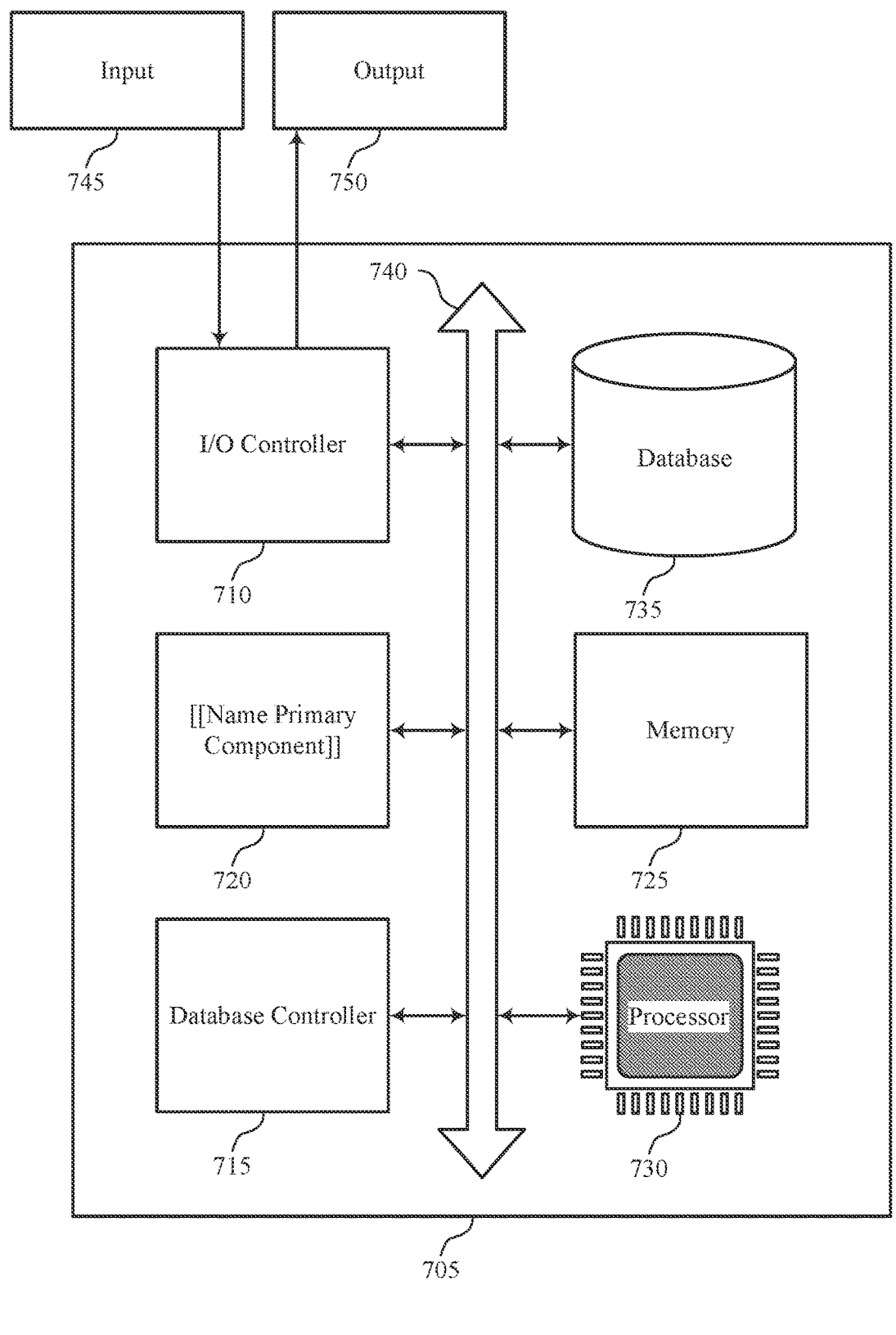
FIG. 7 shows a diagram of a system including a device that supports certificate revocation at datacenters as a service in accordance with aspects of the present disclosure.

FIG. 7 shows a diagram of a system 700 including a device 705 that supports certificate revocation at datacenters as a service in accordance with aspects of the present disclosure. The device 705 may be an example of or include the components of a device 505 as described herein. The device 705 may include components for bi-directional data communications including components for transmitting and receiving communications, such as a data security manager 720, an I/O controller 710, a database controller 715, a memory 725, a processor 730, and a database 735. These components may be in electronic communication or otherwise coupled (e.g., operatively, communicatively, functionally, electronically, electrically) via one or more buses (e.g., a bus 740).

The I/O controller 710 may manage input signals 745 and output signals 750 for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. In other cases, the I/O controller 710 may represent or interact with a modem, a keyboard, a mouse, a touchscreen, or a similar device. In some cases, the I/O controller 710 may be implemented as part of a processor 730. In some examples, a user may interact with the device 705 via the I/O controller 710 or via hardware components controlled by the I/O controller 710.

The database controller 715 may manage data storage and processing in a database 735. In some cases, a user may interact with the database controller 715. In other cases, the database controller 715 may operate automatically without user interaction. The database 735 may be an example of a single database, a distributed database, multiple distributed databases, a data store, a data lake, or an emergency backup database.

Memory 725 may include random-access memory (RAM) and ROM. The memory 725 may store computer-readable, computer-executable software including instructions that, when executed, cause the processor 730 to perform various functions described herein. In some cases, the memory 725 may contain, among other things, a basic I/O system (BIOS) which may control basic hardware or software operation such as the interaction with peripheral components or devices.

The processor 730 may include an intelligent hardware device, (e.g., a general-purpose processor, a digital signal processor (DSP), a central processing unit (CPU), a microcontroller, an application-specific integrated circuit (ASIC), a field-programmable gate-array (FPGA), a programmable logic device, a discrete gate or transistor logic component, a discrete hardware component, or any combination thereof). In some cases, the processor 730 may be configured to operate a memory array using a memory controller. In other cases, a memory controller may be integrated into the processor 730. The processor 730 may be configured to execute computer-readable instructions stored in a memory 725 to perform various functions (e.g., functions or tasks supporting certificate revocation at datacenters as a service).

The data security manager 720 may support data processing in accordance with examples as disclosed herein. For example, the data security manager 720 may be configured as or otherwise support a means for receiving, at a first service executing on a datacenter and from a second service, a request to establish a secure connection, wherein the datacenter is provisioned with an indication of a plurality of certificates that have been revoked by a CA. The data security manager 720 may be configured as or otherwise support a means for receiving, from the second service based at least in part on receiving the request, an indication of a certificate associated with the second service. The data security manager 720 may be configured as or otherwise support a means for validating a certificate chain associated with the certificate based at least in part on the indication of the plurality of certificates that have been revoked by the CA. The data security manager 720 may be configured as or otherwise support a means for communicating with the second service in accordance with validating the certificate chain.

By including or configuring the data security manager 720 in accordance with examples as described herein, the device 705 may support techniques for a service executing on a datacenter to validate a certificate chain for another service locally, which may improve security related to invalid certificates and complexities due to datacenters lacking network connection, among other benefits.

Figure 8:
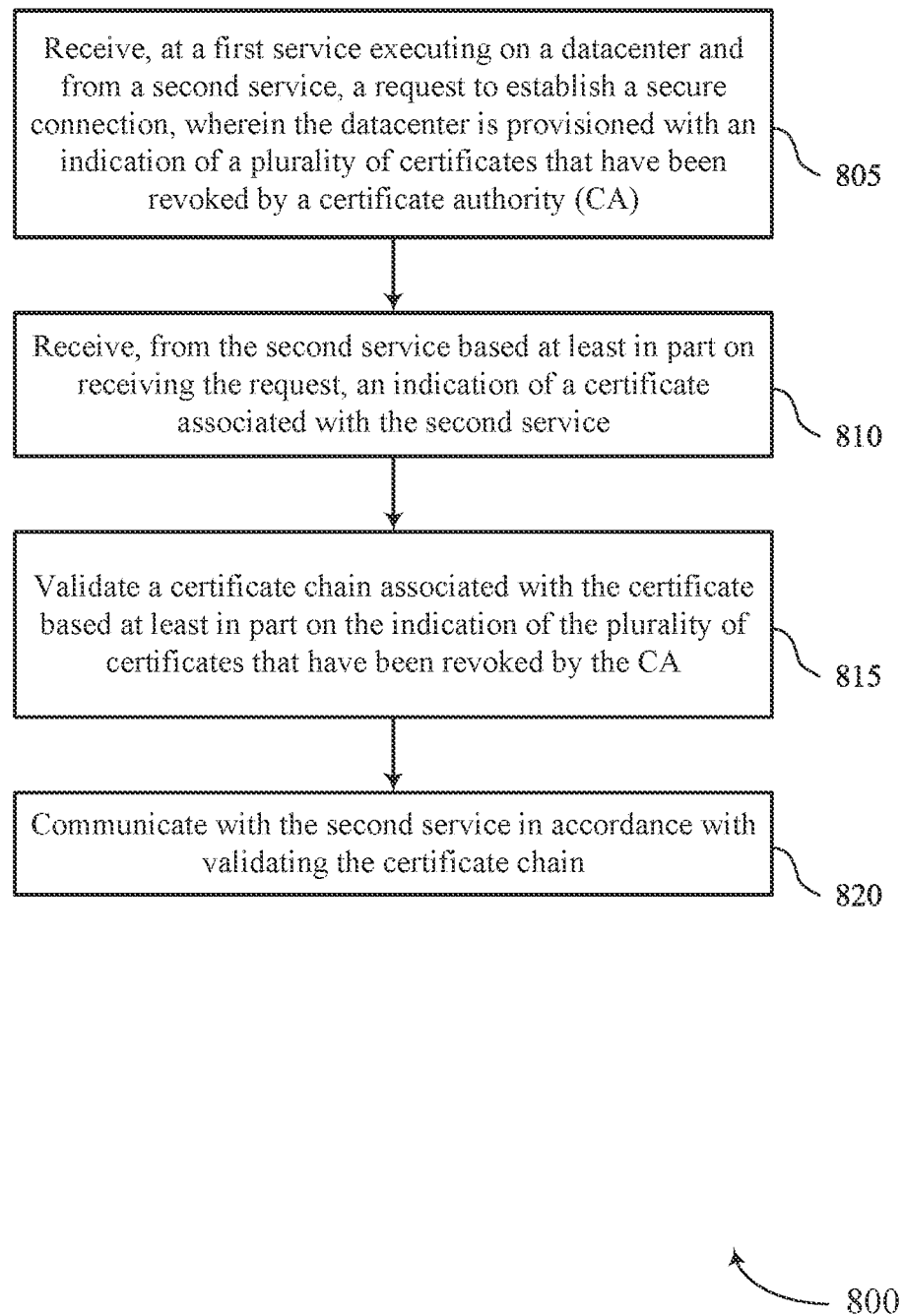
FIGS. 8 through 10 show flowcharts illustrating methods that support certificate revocation at datacenters as a service in accordance with aspects of the present disclosure.

FIG. 8 shows a flowchart illustrating a method 800 that supports certificate revocation at datacenters as a service in accordance with aspects of the present disclosure. The operations of the method 800 may be implemented by an Application Server or its components as described herein. For example, the operations of the method 800 may be performed by an Application Server as described with reference to FIGS. 1 through 7. In some examples, an Application Server may execute a set of instructions to control the functional elements of the Application Server to perform the described functions. Additionally or alternatively, the Application Server may perform aspects of the described functions using special-purpose hardware.

At 805, the method may include receiving, at a first service executing on a datacenter and from a second service, a request to establish a secure connection, wherein the datacenter is provisioned with an indication of a plurality of certificates that have been revoked by a CA. The operations of 805 may be performed in accordance with examples as disclosed herein. In some examples, aspects of the operations of 805 may be performed by a connection component 625 as described with reference to FIG. 6.

At 810, the method may include receiving, from the second service based at least in part on receiving the request, an indication of a certificate associated with the second service. The operations of 810 may be performed in accordance with examples as disclosed herein. In some examples, aspects of the operations of 810 may be performed by a certificate receiver 630 as described with reference to FIG. 6.

At 815, the method may include validating a certificate chain associated with the certificate based at least in part on the indication of the plurality of certificates that have been revoked by the CA. The operations of 815 may be performed in accordance with examples as disclosed herein. In some examples, aspects of the operations of 815 may be performed by a validation manager 635 as described with reference to FIG. 6.

At 820, the method may include communicating with the second service in accordance with validating the certificate chain. The operations of 820 may be performed in accordance with examples as disclosed herein. In some examples, aspects of the operations of 820 may be performed by a communications component 640 as described with reference to FIG. 6.

Figure 9:
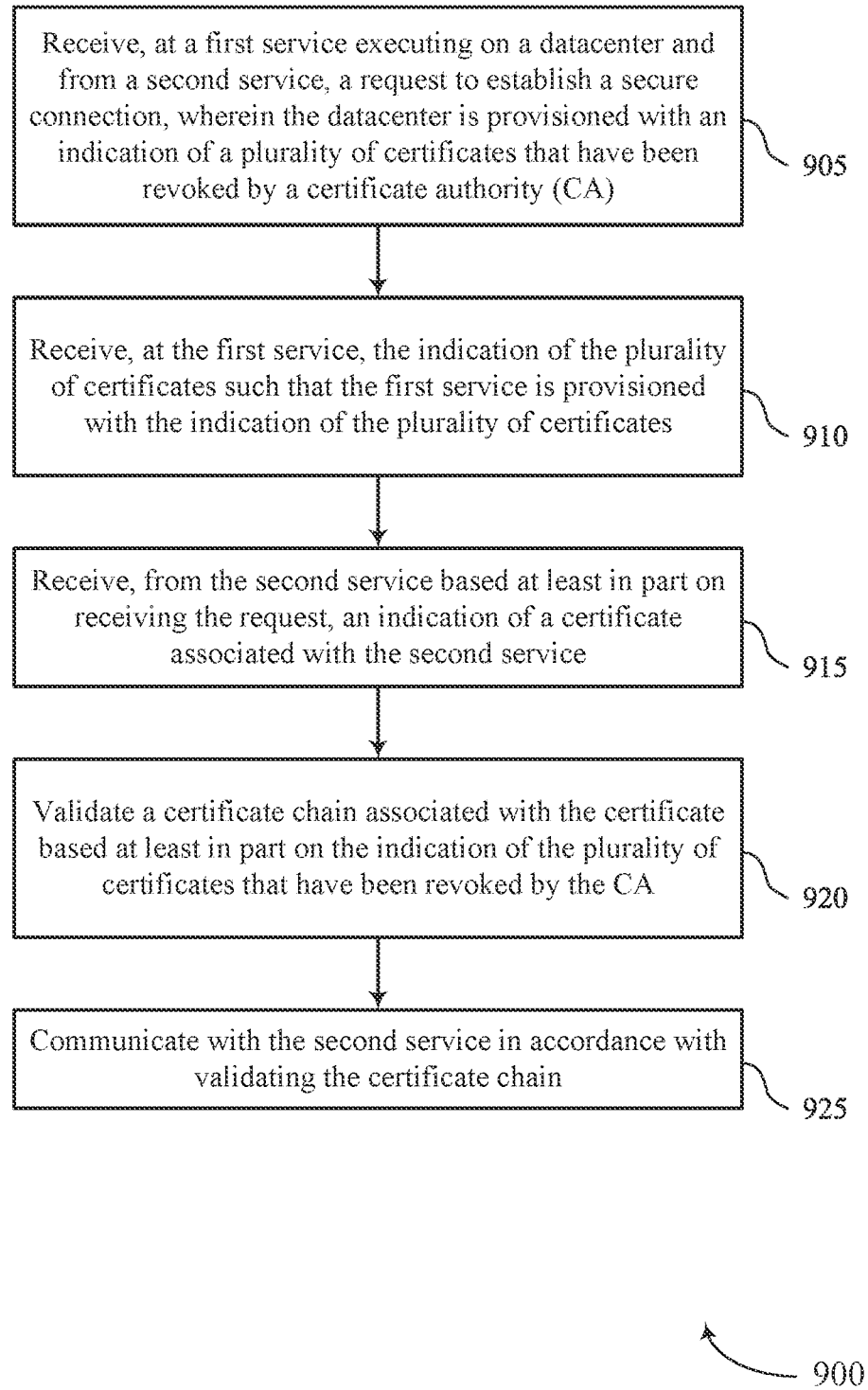

FIG. 9 shows a flowchart illustrating a method 900 that supports certificate revocation at datacenters as a service in accordance with aspects of the present disclosure. The operations of the method 900 may be implemented by an Application Server or its components as described herein. For example, the operations of the method 900 may be performed by an Application Server as described with reference to FIGS. 1 through 7. In some examples, an Application Server may execute a set of instructions to control the functional elements of the Application Server to perform the described functions. Additionally or alternatively, the Application Server may perform aspects of the described functions using special-purpose hardware.

At 905, the method may include receiving, at a first service executing on a datacenter and from a second service, a request to establish a secure connection, wherein the datacenter is provisioned with an indication of a plurality of certificates that have been revoked by a CA. The operations of 905 may be performed in accordance with examples as disclosed herein. In some examples, aspects of the operations of 905 may be performed by a connection component 625 as described with reference to FIG. 6.

At 910, the method may include receiving, at the first service, the indication of the plurality of certificates such that the first service is provisioned with the indication of the plurality of certificates. The operations of 910 may be performed in accordance with examples as disclosed herein. In some examples, aspects of the operations of 910 may be performed by a certificate receiver 630 as described with reference to FIG. 6.

At 915, the method may include receiving, from the second service based at least in part on receiving the request, an indication of a certificate associated with the second service. The operations of 915 may be performed in accordance with examples as disclosed herein. In some examples, aspects of the operations of 915 may be performed by a certificate receiver 630 as described with reference to FIG. 6.

At 920, the method may include validating a certificate chain associated with the certificate based at least in part on the indication of the plurality of certificates that have been revoked by the CA. The operations of 920 may be performed in accordance with examples as disclosed herein. In some examples, aspects of the operations of 920 may be performed by a validation manager 635 as described with reference to FIG. 6.

At 925, the method may include communicating with the second service in accordance with validating the certificate chain. The operations of 925 may be performed in accordance with examples as disclosed herein. In some examples, aspects of the operations of 925 may be performed by a communications component 640 as described with reference to FIG. 6.

Figure 10:
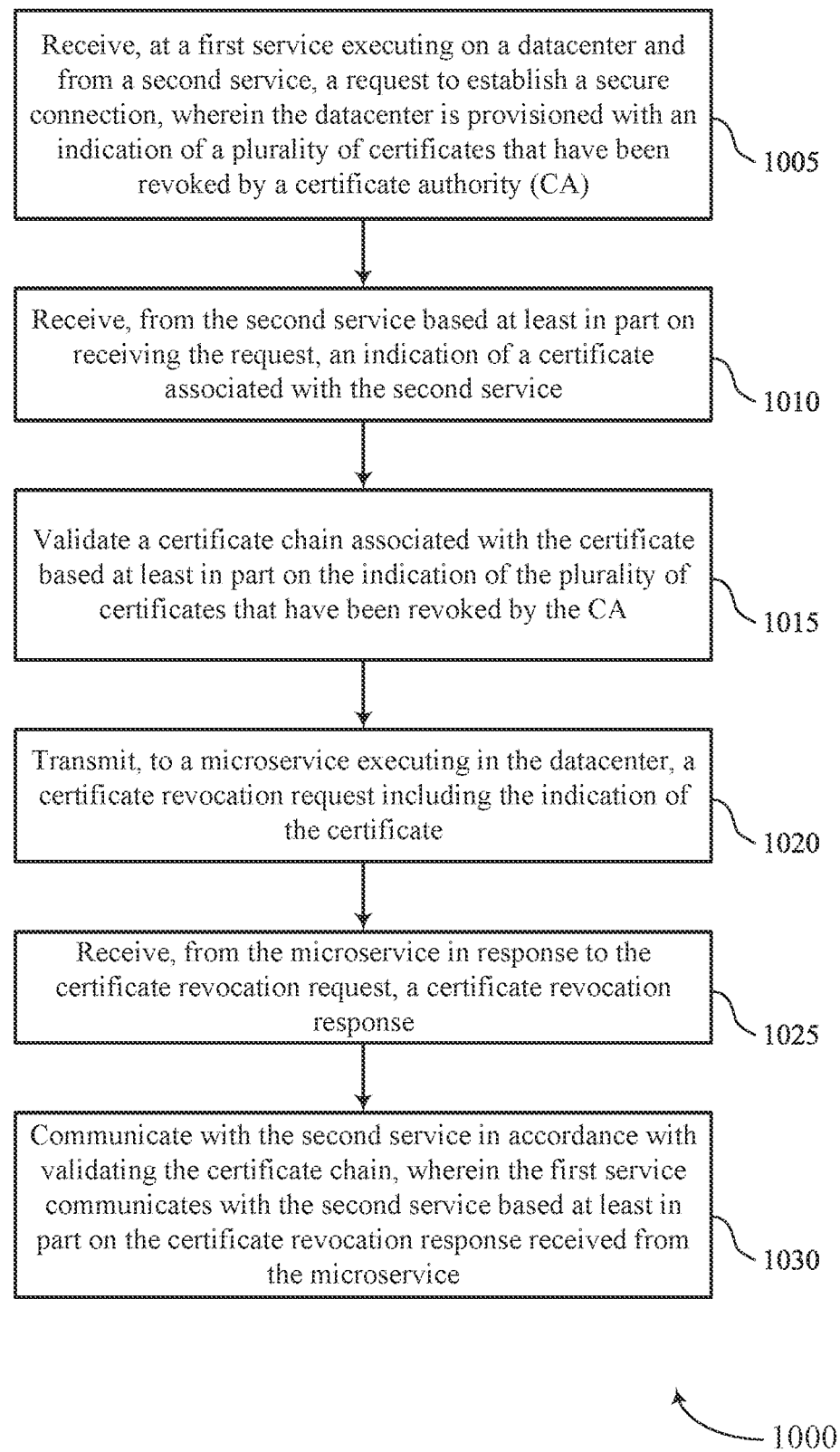

FIG. 10 shows a flowchart illustrating a method 1000 that supports certificate revocation at datacenters as a service in accordance with aspects of the present disclosure. The operations of the method 1000 may be implemented by an Application Server or its components as described herein. For example, the operations of the method 1000 may be performed by an Application Server as described with reference to FIGS. 1 through 7. In some examples, an Application Server may execute a set of instructions to control the functional elements of the Application Server to perform the described functions. Additionally or alternatively, the Application Server may perform aspects of the described functions using special-purpose hardware.

At 1005, the method may include receiving, at a first service executing on a datacenter and from a second service, a request to establish a secure connection, wherein the datacenter is provisioned with an indication of a plurality of certificates that have been revoked by a CA. The operations of 1005 may be performed in accordance with examples as disclosed herein. In some examples, aspects of the operations of 1005 may be performed by a connection component 625 as described with reference to FIG. 6.

At 1010, the method may include receiving, from the second service based at least in part on receiving the request, an indication of a certificate associated with the second service. The operations of 1010 may be performed in accordance with examples as disclosed herein. In some examples, aspects of the operations of 1010 may be performed by a certificate receiver 630 as described with reference to FIG. 6.

At 1015, the method may include validating a certificate chain associated with the certificate based at least in part on the indication of the plurality of certificates that have been revoked by the CA. The operations of 1015 may be performed in accordance with examples as disclosed herein. In some examples, aspects of the operations of 1015 may be performed by a validation manager 635 as described with reference to FIG. 6.

At 1020, the method may include transmitting, to a micro-service executing in the datacenter, a certificate revocation request including the indication of the certificate. The operations of 1020 may be performed in accordance with examples as disclosed herein. In some examples, aspects of the operations of 1020 may be performed by a validation manager 635 as described with reference to FIG. 6.

At 1025, the method may include receiving, from the micro-service in response to the certificate revocation request, a certificate revocation response. The operations of 1025 may be performed in accordance with examples as disclosed herein. In some examples, aspects of the operations of 1025 may be performed by a communications component 640 as described with reference to FIG. 6.

At 1030, the method may include communicating with the second service in accordance with validating the certificate chain, wherein the first service communicates with the second service based at least in part on the certificate revocation response received from the micro-service. The operations of 1030 may be performed in accordance with examples as disclosed herein. In some examples, aspects of the operations of 1030 may be performed by a communications component 640 as described with reference to FIG. 6.

A method for data processing is described. The method may include receiving, at a first service executing on a datacenter and from a second service, a request to establish a secure connection, wherein the datacenter is provisioned with an indication of a plurality of certificates that have been revoked by a CA, receiving, from the second service based at least in part on receiving the request, an indication of a certificate associated with the second service, validating a certificate chain associated with the certificate based at least in part on the indication of the plurality of certificates that have been revoked by the CA, and communicating with the second service in accordance with validating the certificate chain.

An apparatus for data processing is described. The apparatus may include a processor, memory coupled with the processor, and instructions stored in the memory. The instructions may be executable by the processor to cause the apparatus to receive, at a first service executing on a datacenter and from a second service, a request to establish a secure connection, wherein the datacenter is provisioned with an indication of a plurality of certificates that have been revoked by a CA, receive, from the second service based at least in part on receiving the request, an indication of a certificate associated with the second service, validate a certificate chain associated with the certificate based at least in part on the indication of the plurality of certificates that have been revoked by the CA, and communicate with the second service in accordance with validating the certificate chain.

Another apparatus for data processing is described. The apparatus may include means for receiving, at a first service executing on a datacenter and from a second service, a request to establish a secure connection, wherein the datacenter is provisioned with an indication of a plurality of certificates that have been revoked by a CA, means for receiving, from the second service based at least in part on receiving the request, an indication of a certificate associated with the second service, means for validating a certificate chain associated with the certificate based at least in part on the indication of the plurality of certificates that have been revoked by the CA, and means for communicating with the second service in accordance with validating the certificate chain.

A non-transitory computer-readable medium storing code for data processing is described. The code may include instructions executable by a processor to receive, at a first service executing on a datacenter and from a second service, a request to establish a secure connection, wherein the datacenter is provisioned with an indication of a plurality of certificates that have been revoked by a CA, receive, from the second service based at least in part on receiving the request, an indication of a certificate associated with the second service, validate a certificate chain associated with the certificate based at least in part on the indication of the plurality of certificates that have been revoked by the CA, and communicate with the second service in accordance with validating the certificate chain.

Some examples of the method, apparatuses, and non-transitory computer-readable medium described herein may further include operations, features, means, or instructions for receiving, at the first service, the indication of the plurality of certificates such that the first service may be provisioned with the indication of the plurality of certificates.

In some examples of the method, apparatuses, and non-transitory computer-readable medium described herein, validating the certificate chain may include operations, features, means, or instructions for transmitting, to a micro-service executing in the datacenter, a certificate revocation request including the indication of the certificate and receiving, from the micro-service in response to the certificate revocation request, a certificate revocation response, wherein the first service communicates with the second service based at least in part on the certificate revocation response received from the micro-service.

In some examples of the method, apparatuses, and non-transitory computer-readable medium described herein, receiving the indication of the certificate may include operations, features, means, or instructions for receiving a web token that may be digitally signed by the certificate, wherein validating the certificate chain includes validating the web token.

Some examples of the method, apparatuses, and non-transitory computer-readable medium described herein may further include operations, features, means, or instructions for determining, based at least in part on validating the certificate chain, that the certificate may be invalid in accordance with the certificate being included in the plurality of certificates and transmitting, to the second service, an indication of a failure to establish the secure connection based at least in part on determining that the certificate may be included in the plurality of certificates.

Some examples of the method, apparatuses, and non-transitory computer-readable medium described herein may further include operations, features, means, or instructions for determining, based at least in part on validating the certificate chain, that the certificate may be invalid in accordance with the certificate being included in the plurality of certificates and performing, based at least in part on determining that the certificate is invalid, an action in accordance with a security policy.

Some examples of the method, apparatuses, and non-transitory computer-readable medium described herein may further include operations, features, means, or instructions for transmitting, to the second service, an indication of a failure to establish the secure connection or establishing the secure connection with the second service and logging the invalid certificate.

Some examples of the method, apparatuses, and non-transitory computer-readable medium described herein may further include operations, features, means, or instructions for determining, based at least in part on validating the certificate chain, that the certificate may be valid in accordance with the certificate not being included in the plurality of certificates and establishing the secure connection with the second service based at least in part on determining the certificate may be valid.

Some examples of the method, apparatuses, and non-transitory computer-readable medium described herein may further include operations, features, means, or instructions for determining that the certificate may be associated with a user device supported by the datacenter based at least in part on the certificate chain associated with the certificate, wherein the certificate chain may be signed by a private CA, wherein the first service communicates with the user device based at least in part on validating the certificate chain.

In some examples of the method, apparatuses, and non-transitory computer-readable medium described herein, the plurality of certificates comprises public CA certificates, internal CA certificates, or both.

Some examples of the method, apparatuses, and non-transitory computer-readable medium described herein may further include operations, features, means, or instructions for transmitting, based at least in part on receiving the request, an indication of a certificate associated with the first service to the second service.

In some examples of the method, apparatuses, and non-transitory computer-readable medium described herein, validating the certificate chain may include operations, features, means, or instructions for validating the certificate chain on a local area network associated with the datacenter.

In some examples of the method, apparatuses, and non-transitory computer-readable medium described herein, the indication of the plurality of certificates comprises a certificate revocation list or a database including a plurality of revoked certificates.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for data processing, comprising:
    receiving, at a first service executing on a datacenter and from a second service, a request to establish a secure connection, wherein the datacenter is provisioned, prior to the request, with an indication of a plurality of certificates that have been revoked by a certificate authority;
    receiving, from the second service based at least in part on receiving the request, an indication of a certificate associated with the second service, wherein the indication includes a web token that is digitally signed by the certificate using a private key;
    validating, at the first service and based at least in part on validating that the web token is validly signed at the first service, a certificate chain associated with the certificate based at least in part on the indication of the plurality of certificates that have been revoked by the certificate authority; and
    communicating with the second service in accordance with validating the certificate chain.

2. The method of claim 1, further comprising:
    receiving, at the first service, the indication of the plurality of certificates such that the first service is provisioned with the indication of the plurality of certificates.

3. The method of claim 1, wherein validating the certificate chain comprises:
    transmitting, to a micro-service executing in the datacenter, a certificate revocation request including the indication of the certificate; and
    receiving, from the micro-service in response to the certificate revocation request, a certificate revocation response, wherein the first service communicates with the second service based at least in part on the certificate revocation response received from the micro-service.

4. The method of claim 1, further comprising:
    determining, based at least in part on validating the certificate chain, that the certificate is invalid in accordance with the certificate being included in the plurality of certificates; and
    performing, based at least in part on determining that the certificate is invalid, an action in accordance with a security policy.

5. The method of claim 4, wherein performing the action comprises:
    transmitting, to the second service, an indication of a failure to establish the secure connection or establishing the secure connection with the second service and logging the invalid certificate.

6. The method of claim 1, further comprising:
    determining, based at least in part on validating the certificate chain, that the certificate is valid in accordance with the certificate not being included in the plurality of certificates; and
    establishing the secure connection with the second service based at least in part on determining the certificate is valid.

7. The method of claim 1, further comprising:
    determining that the certificate is associated with a user device supported by the datacenter based at least in part on the certificate chain associated with the certificate, wherein the certificate chain is signed by a private certificate authority, wherein the first service communicates with the user device based at least in part on validating the certificate chain.

8. The method of claim 1, wherein the plurality of certificates comprises public certificate authority certificates, internal certificate authority certificates, or both.

9. The method of claim 1, further comprising:
    transmitting, based at least in part on receiving the request, an indication of a certificate associated with the first service to the second service.

10. The method of claim 1, wherein validating the certificate chain comprises:
    validating the certificate chain on a local area network associated with the datacenter.

11. The method of claim 1, wherein the indication of the plurality of certificates comprises a certificate revocation list or a database including a plurality of revoked certificates.

12. An apparatus for data processing, comprising:
    one or more processors;
    one or more memories coupled with the one or more processors; and
    instructions stored in the one or more memories and executable by the one or more processors to cause the apparatus to:
        receive, at a first service executing on a datacenter and from a second service, a request to establish a secure connection, wherein the datacenter is provisioned, prior to the request, with an indication of a plurality of certificates that have been revoked by a certificate authority;
        receive, from the second service based at least in part on receiving the request, an indication of a certificate associated with the second service, wherein the indication includes a web token that is digitally signed by the certificate using a private key;
        validate, at the first service and based at least in part on validating that the web token is validly signed at the first service, a certificate chain associated with the certificate based at least in part on the indication of the plurality of certificates that have been revoked by the certificate authority; and
        communicate with the second service in accordance with validating the certificate chain.

13. The apparatus of claim 12, wherein the instructions are further executable by the one or more processors to cause the apparatus to:
    receive, at the first service, the indication of the plurality of certificates such that the first service is provisioned with the indication of the plurality of certificates.

14. The apparatus of claim 12, wherein the instructions to validate the certificate chain are executable by the one or more processors to cause the apparatus to:
    transmit, to a micro-service executing in the datacenter, a certificate revocation request including the indication of the certificate; and
    receive, from the micro-service in response to the certificate revocation request, a certificate revocation response, wherein the first service communicates with the second service based at least in part on the certificate revocation response received from the micro-service.

15. The apparatus of claim 12, wherein the instructions are further executable by the one or more processors to cause the apparatus to:

determine, based at least in part on validating the certificate chain, that the certificate is invalid in accordance with the certificate being included in the plurality of certificates; and transmit, to the second service, an indication of a failure to establish the secure connection based at least in part on determining that the certificate is included in the plurality of certificates.

16. The apparatus of claim 12, wherein the instructions are further executable by the one or more processors to cause the apparatus to:

determine, based at least in part on validating the certificate chain, that the certificate is valid in accordance with the certificate not being included in the plurality of certificates; and establish the secure connection with the second service based at least in part on determining the certificate is valid.

17. The apparatus of claim 12, wherein the instructions are further executable by the one or more processors to cause the apparatus to:

determine that the certificate is associated with a user device supported by the datacenter based at least in part on the certificate chain associated with the certificate, wherein the certificate chain is signed by a private certificate authority, wherein the first service communicates with the user device based at least in part on validating the certificate chain.

18. A non-transitory computer-readable medium storing code for data processing, the code comprising instructions executable by one or more processors to:

receive, at a first service executing on a datacenter and from a second service, a request to establish a secure connection, wherein the datacenter is provisioned, prior to the request, with an indication of a plurality of certificates that have been revoked by a certificate authority;

receive, from the second service based at least in part on receiving the request, an indication of a certificate associated with the second service, wherein the indication includes a web token that is digitally signed by the certificate using a private key;

validate, at the first service and based at least in part on validating that the web token is validly signed at the first service, a certificate chain associated with the certificate based at least in part on the indication of the plurality of certificates that have been revoked by the certificate authority; and communicate with the second service in accordance with validating the certificate chain.

* * * * *